Sept. 29, 1964 P. W. KLOOZ 3,150,390
APPARATUS FOR TRIMMING SEQUENTIALLY THE OPPOSITE
ENDS OF AN ELONGATED WORKPIECE
Filed Aug. 11, 1959 4 Sheets-Sheet 1

FIG. I

INVENTOR
PAUL W. KLOOZ

BY *Lindsey and Prutzman*
ATTORNEYS

INVENTOR
PAUL W. KLOOZ

BY Lindsey and Prutzman
ATTORNEYS 3,150,390
APPARATUS FOR TRIMMING SEQUENTIALLY THE OPPOSITE ENDS OF AN ELONGATED WORKPIECE
Paul W. Klooz, West Hartford, Conn., assignor, by mesne assignments, to Veeder-Root Incorporated, Hartford, Conn., a corporation of Connecticut
Filed Aug. 11, 1959, Ser. No. 832,990
12 Claims. (Cl. 10—9)

This invention relates generally to machine tools of the type performing trimming, chamfering, shaving, skiving and similar operations on workpieces such as headed blanks having two or more diameters, slugs, bars and the like and is particularly concerned with a machine tool of this type suitable for machining sequentially the opposite ends of such an elongated workpiece in a completely automatic operation.

As pointed out in my prior Patent No. 2,881,452, issued to the assignee of the present invention, apparatus of this type has particular utility in the art of manufacturing socket headscrews, although its general utility is not limited to this art. After a socket has been formed in the rod stock slug during the manufacture of a socket headscrew, it is necessary to trim both ends of the slug and it is most desirable that this trimming operation be performed at high speed. The problem of high speed, economical production of socket headscrews and similar workpieces is greatly complicated as the workpieces increase in length. Also, it is desirable to be able to use the same machine to trim workpieces of widely different length.

It is therefore an object of the present invention to provide a single machine that sequentially trims the opposite ends of workpieces which is particularly adapted for use with workpieces of relatively long length and which is adjustable for use throughout a long range of sizes of workpieces.

It is a further object of this invention to provide a machine that trims the opposite ends of a workpiece in sequence at high speeds and which can trim workpieces of widely varying length without necessitating material alterations in the workpiece loading or feed mechanism.

It is a still further object of this invention to provide a machine of the foregoing character having an improved transfer mechanism for transferring a workpiece between two adjacent chucking devices and for reversing the workpiece end for end, which transfer mechanism is easily adjustable to accommodate a wide range of workpiece sizes.

It is another object of this invention to provide a work loading mechanism for a machine of the class described, which work loading mechanism is capable of loading workpieces of widely varying lengths into a chuck without adjustment.

It is yet another object of this invention to provide a machine of the foregoing character which is low in cost, which requires little supervision or attention during normal operation, which is durable and reliable in operation and which requires minimum operational maintenance.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
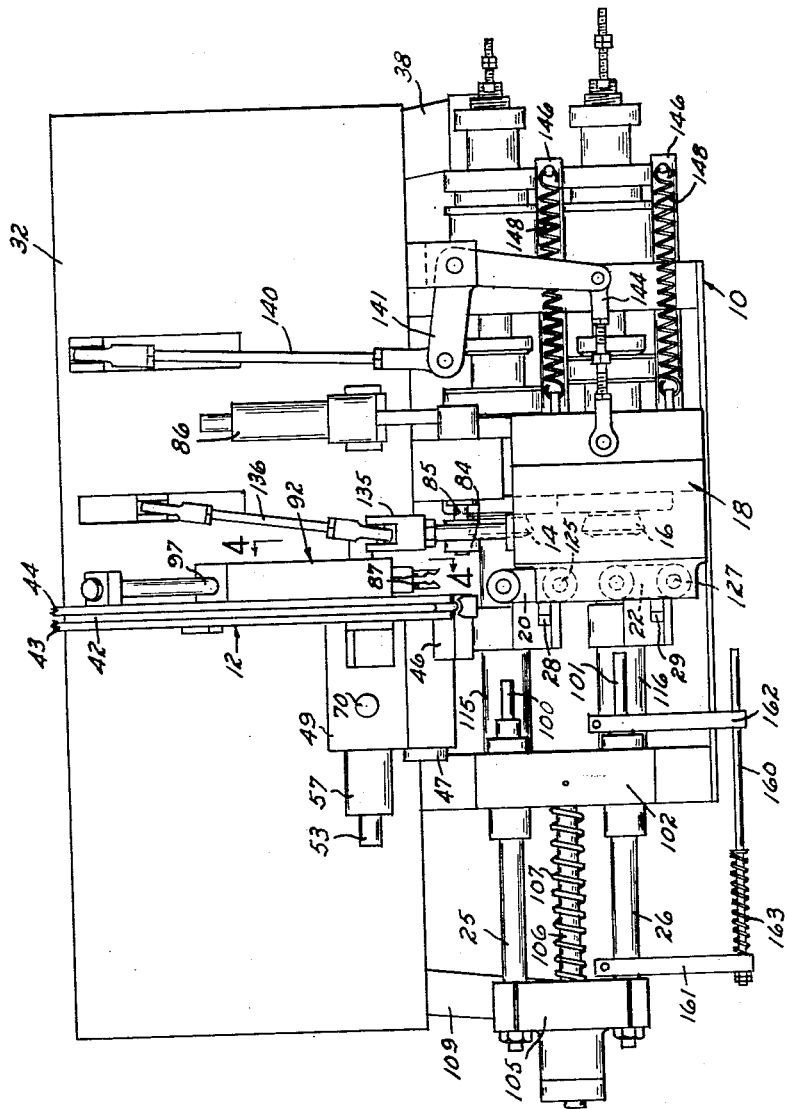
FIG. 1 is a top plan view of a preferred embodiment of the apparatus of the present invention.

Before describing the mechanism of the present invention in detail, the following general summary of the main operating parts and their functional relationship will assist in the understanding of the invention. Referring to FIG. 1, the basic machine includes a frame 10 on which is mounted a work feeding or loading device 12 that conveys workpieces in sequence to the first of two spindle collets 14 and 16. Collets 14 and 16 are arranged in spaced generally parallel relationship and are operated in unison to simultaneously rotate two workpieces which are gripped at one end thereof, the workpieces being transferred to the collets in sequence and being reversed when transferred to the second collet so that a trimming operation may be performed on one end of a workpiece contained in collet 14, while, at the same time, the opposite end of a similar workpiece previously trimmed at one end while in collet 14 is being held for a trimming operation in collet 16. The collets or chucking devices 14, 16 are of conventional type such as that disclosed in detail in my prior Patent No. 2,881,452.

In order to transfer the workpiece contained in collet 14 to collet 16 and, at the same time, to reverse its position end for end, transfer frame 18 is mounted on frame 10 and has carrier 20 mounted thereon for pivotal movement from a position of alignment with collet 14 to a position of alignment with collet 16. In addition, carrier 22 is pivotally mounted on transfer frame 18 for movement from a position of alignment with collet 16 to a position of alignment with a suitable collection device (not shown) for fully trimmed workpieces adjacent frame 10. To assist in removal of the workpieces from the collets 14 and 16, conventional ejector mechanism (not shown) is provided, within the internal automatic operating mechanism of the collets. The pusher mechanisms 25, 26 are provided to inject the workpieces into the collets from the transfer mechanism. The necessary trimming operation is performed on the free end of the workpiece held in each collet by cutting tools 28 and 29. The proper programming of the operation of the foregoing briefly described mechanisms is provided by an enclosed series of cams or cam mechanisms indicated diagrammatically at 32, which cams are driven in timed relationship to each other and are connected to the aforementioned operating mechanisms by appropriate driving linkages.

Having described the general structural and operational characteristics of my apparatus, reference is now made in detail to the collets or chucking devices 14 and 16. As most clearly seen in FIGS. 2 and 3, each collet is provided with a collet cap 35, having a beveled aperture therein in which are disposed gripping fingers 36 that are urged into clamping relationship with a workpiece when the conventional actuating mechanism is operated. Reverse operation of the actuating mechanism releases the fingers and, at the same time, causes a conventional ejecting pin (not shown), centrally disposed within the collet, to be moved forwardly to eject the workpiece contained therein. Lever arm 38 connects the two chuck operating mechanisms of this apparatus to the cam mechanism 32 to effect simultaneous gripping and release-ejecting operation of the collets 14 and 16 in proper timed sequence to the other operations of the mechanisms of this invention. For simplicity and brevity of presentation and since the cam mechanism 32 is conventional, it has not been deemed necessary to show each of the individual cams in detail.

Coming now to the work loading mechanism 12, it is seen by reference to the drawings and particularly FIGS.

3, 4 and 5, that workloading arm 40, mounted on frame 10 and inclined downwardly to a point adjacent collet 14, is provided with a feed slot 42 and a pair of adjustably mounted guide rails 43 and 44. The workpieces slide by gravity down arm 40 between rails 43 and 44 and towards gate 46 in an upright position with their heads resting on the top of the rails. Gate 46 is mounted on plunger 47 which is received in aperture 48 of guide frame 49 secured to arm 40. Gate 46 and plunger 47 are driven by pin 51 which extends laterally through slots 54 and 55 in guide block 49 and through plunger 47 to engage drive rod 53. Drive rod 53 is provided with a necked down end 58 that normally engages yoke 60 on lever 61 which is pivotally mounted on frame 10 by bolt 62. The lower end of lever 61 carries follower 63 which engages cam 64 mounted on cam shaft 65 in cam box 32. Cam surface 66 is positioned on cam 64 to impart oscillatory movement to lever 61 (and therefore oscillatory movement to gate 46) in proper timed sequence to the other mechanisms of my apparatus. Drive rod 53 (and consequently gate 46) when moved by the cam in the opposite direction from the collet 14 loads the return spring 56 contained within generally cylindrical guide 57. For convenience, lockout plunger 70 is mounted on guide block 49 so that, when gate 46 is in the poistion closing feed rails 43 and 44, pin 51 may be depressed to engage plunger 53 and lock gate 46 in the closed position to permit operation of the machine with the feed mechanism or work loader 12 disabled. In this position, the lever 61 merely oscillates in its timed pattern but movement of gate 46 under the influence of spring 56 is precluded.

In order to accommodate workpieces of various lengths and to move one of such workpieces from a position of alignment with feed rails 43 and 44 to a second position wherein it can be grasped by the feed finger mechanism designated generally as 92, a groove 93 is provided in gate 46 in alignment with slot 42 and, in the preferred embodiment, an enlarged groove portion 94 is provided above groove 93 to receive the head of the workpiece and support it on ledge 95.

Figure 3:
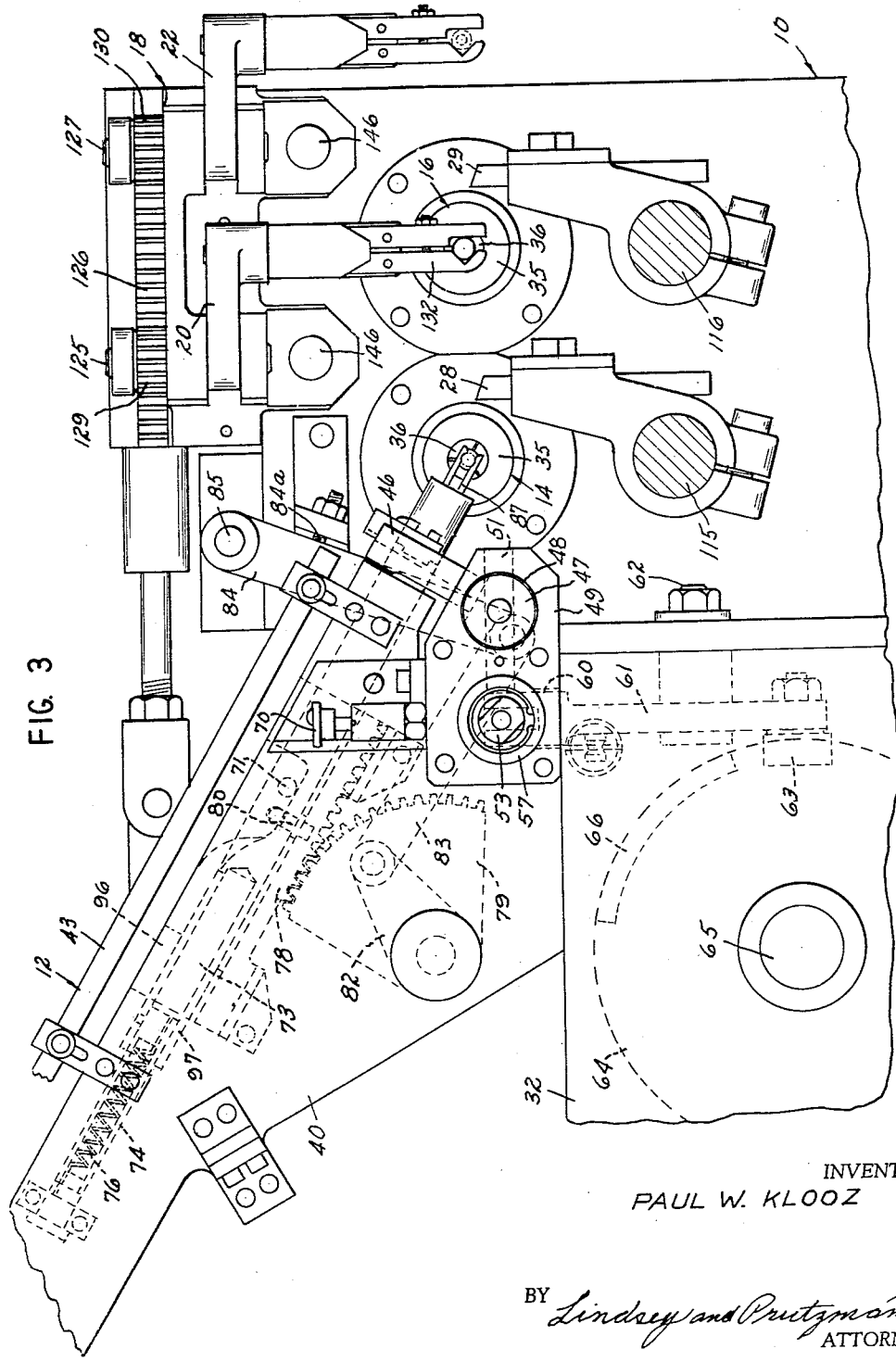
FIG. 3 is a partial front view of the apparatus of FIG. 1.
Figure 4:
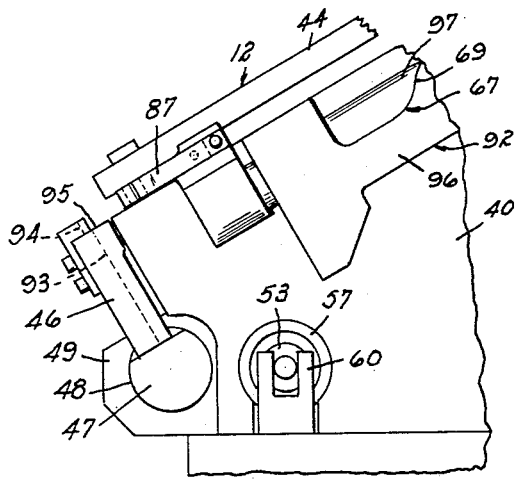
FIG. 4 is a partial side elevation view of the work loading mechanism taken generally along the lines 4—4 of FIG. 1.

Transfer of a single workpiece from groove 93 in gate 46 to a position wherein the workpiece is aligned with collet 14 is provided by feed finger mechanism 92 which is arranged generally parallel to and mounted on arm 40. Guide block 96 is fastened to the side of arm 40 and is provided with a longitudinally extending cam slot 67 having a straight portion 68 and an arcuate portion 69. Feed arm 97 is mounted in guide block 96 for longitudinal sliding movement and is provided with a radially extending pin 71 which acts as a cam follower to rotatably position arm 97 in accordance with the configuration of cam track 67, as hereinafter explained. As most clearly seen in FIG. 3 arm 97 is provided with a cylindrical aperture 73 in which guide tube 74 is slidably received. Guide tube 74 is fastened at one end to arm 40 and contains therein a coiled torsion spring 76 having one end secured to arm 40 and having its other end secured to arm 97 through a slot in guide tube 74. Rack 78 is slidably mounted on guide block 96 and is in toothed engagement with segment gear 79. Pin 80 is fastened to rack 78 and engages a circumferential slot in arm 97 to establish driving engagement between rack 78 and arm 97 regardless of the rotated position of arm 97. Crank 82 is rigidly secured to sector gear 79 and is pivotally connected to link 83 which in turn is pivotally connected to link 84 journaled on rockshaft 85. Rockshaft 85 is driven in an oscillatory manner by the cam mechanism 32 acting through spring buffer assembly 86. The limits of the pivotal movement of link 84 are determined by a pair of adjustable stops 84a (one of which is shown in FIG. 3). A pair of spring-pressed feed fingers 87 are fixedly secured to the end of shaft 97 adjacent gate 46 and are dimensioned to clampingly engage a workpiece carried in groove 93.

Figure 5:
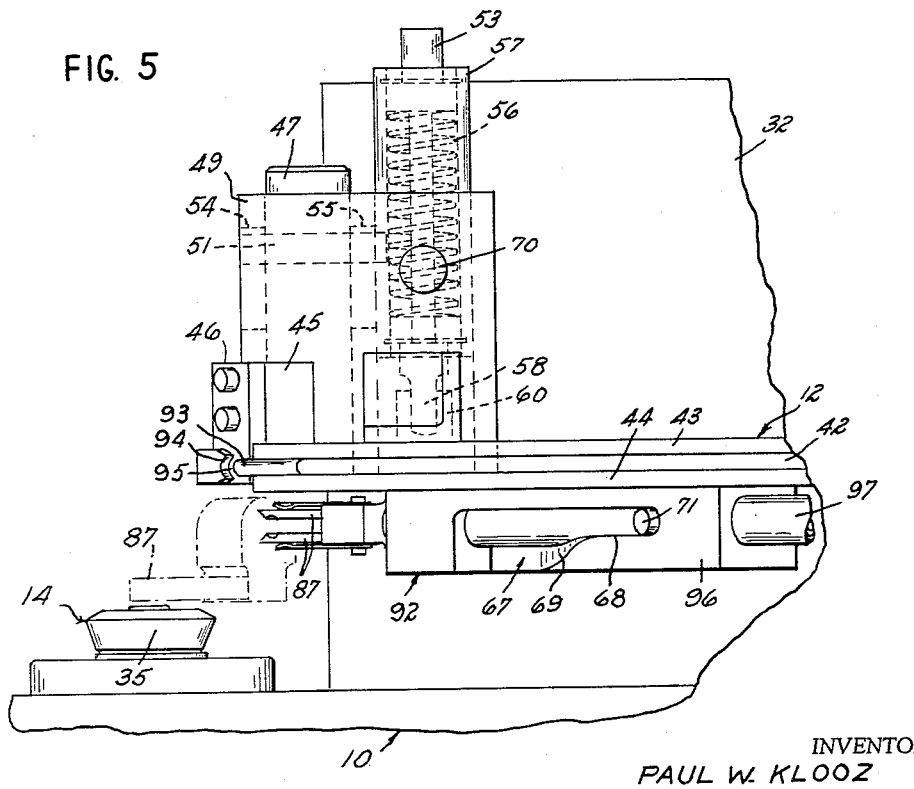
FIG. 5 is an enlarged partial top plan view of the work loading mechanism of FIG. 1.

The operation of the work loading mechanism of my apparatus can best be appreciated by referring to FIGS. 3 and 5 wherein it will be seen that a workpiece standing upright between feed rails 43 and 44 will slide down between these rails until it rests in the trough or groove 93 in gate 46 with its head extending beyond groove 93 and resting on ledge 95. As gate 46 is moved towards collet 14, flat portion 45 of gate 46 closes off the end of the slot 42 and positions the single workpiece in groove 93 at a position adjacent to slot 42 and in alignment with feed fingers 87. Arm 97 is then advanced by sector gear 83 through the straight portion 68 of cam slot 67 until fingers 87 engage and grasp the head of the workpiece. At this time, the cam mechanism 32 causes retraction of gate 46 to the position shown in FIG. 5, and, at the same time, advances arm 97 into the arcuate portion 69 of cam track 67 to enable arm 97 to rotate 90° under the influence of spring 76. Slight additional forward travel is provided by this cam track portion so that the final advanced position of feed fingers 87 is one in which the fingers are rotated and advanced to the position wherein the workpiece is in alignment with collet 14.

In order to inject a workpiece into either or both of the collets, injectors 25 and 26 are utilized and generally comprise plunger 100, aligned with collet 14, and plunger 101 aligned with collet 16, each of which are mounted for sliding movement in transverse frame member 102. Yoke 105 is slidably mounted on guide rail 106 about which is disposed the coiled compression spring 107. Arm 109 is pivotally connected to yoke 105 and is driven by the cam mechanism 32 in timed relationship to move yoke 105 against compression spring 107 to bring plungers 100 and 101 forward to force a workpiece aligned with the concerned collet into the collet. Thus the workpiece positioned in alignment with collet 14 by feed fingers 87 is forced into collet 14 and out of feed fingers 87 by plunger 100. The injectors are thereafter withdrawn to a remote position to permit appropriate cutting tools to be advanced into engagement with the workpiece in the collet to perform the end trimming operation.

Figure 2:
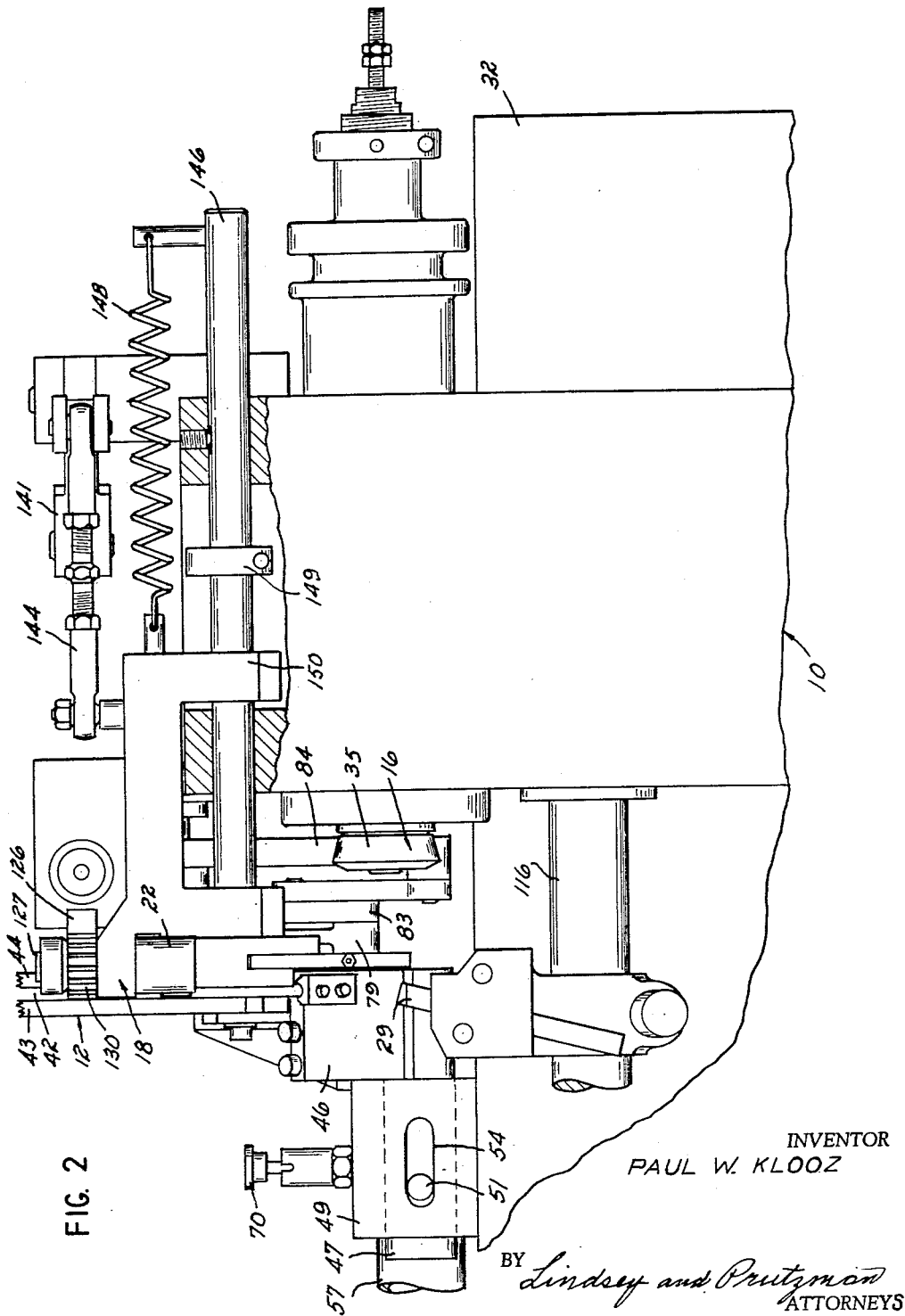
FIG. 2 is a partial side elevation view of the apparatus of FIG. 1.

As most clearly seen in FIGS. 2 and 3, a pair of generally parallel rockshafts 115 and 116 are journaled for rotation in frame 10 and carry adjacent their outer ends cutting tools 28 and 29 for engagement with the ends of the workpieces protruding from collets 14 and 16. Rockshafts 115 and 116 are also controlled by the cam mechanism 32 to bring cutting tool 28 into engagement with the end of the workpiece contained in collet 14 (as yet there is no workpiece contained in collect 16 for tool 29 to engage). After the cutting operation is performed, the rockshaft is pivoted to withdraw the cutting tools to a position spaced from the collets and the workpieces contained therein.

In order to effect the transfer and end-for-end reversal of the workpiece contained in collet 14 to collet 16 so that the other end can be trimmed, transfer arm 20 is pivotally mounted on transfer frame 18 for rotation with shaft 125 journaled in frame 18. Rack 126 is mounted for sliding movement in frame 18 and engages the pinion 129 affixed to shaft 125. Shaft 125 is positioned substantially midway between collets 14 and 16 and arm 20 is provided with spring pressed fingers 132 depending therefrom so that arm 20 can rotate between a position wherein fingers 132 are aligned with collet 14 to a position wherein fingers 132 are aligned with collet 16 (see FIG. 3). Arm 22 is mounted on shaft 127 which is also journaled for rotation on frame 18. Pinion 130 is secured to the end of shaft 127 and meshes with rack 126 so that arms 20 and 22 move simultaneously. It is noted that arms 22 and 20 are substantially identical in construction and that arm 22 is positioned relative to collet 16 so that it can pivot between a position of alignment with collet 16 in which the fingers grasp a workpiece contained in collet 16 to a position shown in FIG. 3 wherein the workpiece is moved away from collet 16 and frame 10 to a position from which it can be conveniently placed in an appropriate receiver for trimmed goods. As seen in FIG. 1, rack 126 has yoke 135 attached at one end, which yoke is pivotally engaged by link 136. Link 136 is connected to the cam mechanism 32 to effect reciprocating motion of rack 126 and pivotal motion of arms 20 and 22 in a timed manner properly related to the operation of other mechanisms of my apparatus.

In order to transfer workpieces of widely varying lengths from collet 14 to collet 16 and to insure that the transferred workpiece will be properly aligned with collet 16, transfer frame 18, on which transfer arms 20 and 22 are mounted, is mounted for sliding movement on frame 10. This sliding movement is imparted to frame 18 by the cam mechanism 32 acting through link 140, bell crank 141 and adjustable link 144. As seen in FIG. 1, bell crank 141 is pivotally mounted on frame 10 and pivotally connected at its ends to link 140 and adjustable link 144, respectively. As most clearly seen in FIG. 2, transfer frame 18 is slidably mounted on a pair of generally parallel guide bars 146 (one of which is shown in FIG. 2) and provided with spring 148 which urges transfer frame 18 towards adjustably positioned stop 149. Thus, as link 140 is moved by its associated cam, bell crank 142 rotates to slide transfer frame 18 on bars 146. In the direction of movement of frame 18 away from stop 149, spring 148 is extended and acts to provide the return force for frame 18. Each complete cycle of movement of the cam which controls link 140, causes transfer frame 18 to move to a given fully extended position and spring 148 returns frame 18 towards collets 14 and 16 until stop 149 is engaged by rear leg 150 of frame 18.

In a preferred embodiment of the invention the transfer frame has a dwell position during a cutting operation which is the fully extended position of frame 18 as shown in FIG. 2. At this position, the transfer arms 20 and 22 are positioned remote from cutting tools 28 and 29 and collets 14 and 16 and it has been found desirable to select a dwell position of the arms 20 and 22, as determined by the position of rack 126, to be one in which the arms are at a slight angle from the perpendicular to the transfer frame. When the trimming operation has been completed, the rack 126 is moved to cause rotation of arm 20 to a position of alignment with collet 14, after which transfer frame 18 is moved towards collets 14 and 16 by an amount determined by the position of stop 149. As frame 18 moves towards the collets, the transfer fingers, having been rotated to a position of alignment with the workpieces in the collets, slide over the workpieces. At this time, the collets are opened, the ejectors operate to push the workpiece out of the collet and the workpiece is then in position for transfer to its next operating position. Transfer frame 18 is now moved forward to its outermost position, at which position rack 126 is moved to rotate arm 20 to a position of alignment with collet 16. Because arm 20 has been moved away from the collets before it is rotated, a workpiece of considerably greater length can be rotated into a position of alignment with collet 16. Transfer frame 18 is then moved in toward collet 16 and yoke 105 is advanced by lever 109 to bring injector 26 and plunger 101 into position to push the workpiece held by arm 20 into collet 16, after which yoke 105 is withdrawn, the collets close, and transfer frame 18 is moved outwardly to the dwell position to disengage arm 20 from the workpiece.

It is noted at this point that the operation of work loader 12 is synchronized with the transfer operation so that when arm 20 has rotated into a position of alignment with collet 16 and transfer frame 18 has been withdrawn by spring 148 to a position determined by stop 149, a new workpiece is positioned in alignment with collet 14 so that movement of yoke 105 causes injectors 25 and 26 to function simultaneously to insert a new workpiece into collet 14 and to insert the reverse end of the workpiece from collet 14 into collet 16.

In order to facilitate collection of the workpieces from collet 16 after both ends have been trimmed, the arm 22 is provided, having a pattern of operation substantially identical with that of arm 20, to grasp the finished workpiece from collet 16 and move it to the position shown in FIG. 3 wherein it is positioned over an appropriate receiver. The auxiliary ejector 160 is slidably mounted in support arms 161 and 162 which in turn are fixed to injector 26. Spring 163 is operative between arm 161 and auxiliary ejector 160 to provide a resilient drive to compensate for variations in length of the workpieces contained in arm 22. Thus, as the injectors move forward, the auxiliary ejector 160 engages and removes the finished workpiece from arm 22.

It is believed to be advantageous to the understanding of the foregoing structure to briefly summarize a complete cycle of operation of the apparatus of my invention so as to properly relate the time sequence of the various operations. It is noted that, in the preferred embodiment, a single cam shaft 65 is provided to drive the cam mechanism 32 which controls the operation of the various mechanisms of my apparatus, thereby insuring their proper timed relationship. Assuming that there is a completely finished workpiece in collet 16, a workpiece which has only one end trimmed in collet 14 and a supply of untrimmed workpieces in work loader 12, it can be seen that transfer arms 20 and 22 are rotated from their dwell position to a position wherein arm 20 is aligned with collet 14 and arm 22 is aligned with collet 16, after which transfer frame 18 is moved inwardly against the stop 149. Collets 14 and 16 open simultaneously and the ejectors contained therein force the workpieces out of collets 14 and 16 into arms 20 and 22. Transfer frame 18 is then driven outwardly to its dwell position, at which point arms 20 and 22 rotate to the solid line position shown in FIG. 3. Transfer frame 18 is then moved back to engage stop 149 and, at the same time, gate 46 is moved towards collet 14 to bring a single workpiece into alignment with transfer fingers 87. Transfer fingers 87 are then advanced to grasp the workpiece and gate 46 is withdrawn. Transfer fingers 87 continue to advance and are rotated 90° to bring an untrimmed workpiece into alignment with collet 14. Yoke 105 is then advanced so that injector 25 forces the untrimmed workpiece into collet 14, injector 26 forces the trimmed end of the workpiece in transfer arm 20 into collet 16 and auxiliary ejector 160 forces the finished workpiece out of the transfer arm 22. Collets 14 and 16 are now closed and transfer frame 18 is moved outwardly to the dwell position. Cutting tools 28 and 29 are rotated by rockshafts 115 and 116 into the cutting position and collets 14 and 16 are rotated by an appropriate drive mechanism. This sequence of operation is repeated as often as is necessary to trim the opposite ends of the desired number of workpieces and to deposit the workpieces in an appropriate receptacle.

From the foregoing description of the structure and operation of my apparatus, it is apparent that I have provided a trimming apparatus which accommodates a wide variety of different lengths of workpieces and which permits the machine to operate upon the workpieces by making only one simple adjustment, i.e., the positioning of the stop which determines the inward movement of the transfer frame relative to the collets. This improved apparatus utilizes an improved feed mechanism and an improved transfer mechanism whose operation does not depend upon the proper length of the workpiece. My improved apparatus is reliable and dependable in operation, is economical to manufacture, and can be operated without special training and with a minimum of supervision.

As will be apparent to persons skilled in the art, various modifications and adaptations of the structure above described will become readily apparent without departure from the spirit and scope of the invention, the scope of which is defined in the appended claims.

I claim:

1. Apparatus for sequentially trimming the opposite ends of an elongated article comprising; first and second chuck means for successively holding the article, a transfer frame, means supporting said transfer frame for oscillatory movement toward and away from said first and second chuck means, a transfer member pivotally mounted on said frame and having a first position aligned with said first chuck means and a second position aligned with said second chuck means, drive means operative to move said transfer frame to a dwell position displaced from said chuck means, means operative to pivot said transfer arm to said second position while said frame is in the dwell position, said drive means being operative to move said frame toward said chuck means after said transfer arm has rotated to said second position to reverse said article end for end, a pusher aligned with said second chuck means and operative to push the article from said transfer arm into said second chuck means when said transfer arm is in said second position, said drive means being further operative to move said transfer frame to said dwell position after said second pusher has placed the article in said second chuck means, cutting means positioned adjacent each said chuck means to engage the article contained therein when said frame is in the dwell position, guide means for feeding the article to a location adjacent said first chuck means, a work loader positioned adjacent to said guide means and said chuck means for positioning one article from said guide means in alignment with said first chuck means, means for operating said work loader when said transfer frame is in said first position, and a pusher aligned with said first chuck means and operative to push the article from said work loader into said first chuck means while said transfer frame is in said first position.

2. Apparatus for sequentially trimming the opposite ends of an elongated article comprising: first and second chuck means for successively holding the article in a horizontal position, parallel spaced apart guide rails inclined downwardly toward and terminating adjacent said first chuck means, a gate positioned at the end of said guide rails and operative to move one article from said guide rails to a position spaced therefrom, a transfer frame, means supporting said frame for oscillatory movement toward and away from said first and second chuck means, a transfer member pivotally mounted on said frame and having a first position aligned with said first chuck means and a second position aligned with said second chuck means, drive means operative to move said transfer frame to a dwell position spaced from said chuck means, means operative to rotate said transfer arm to said second position while said frame is in the dwell position, said drive means being operative to move said frame toward said chuck means after said transfer arm has rotated to said second position to reverse said article end for end, a pusher aligned with said second chuck means and operative to push the article from said transfer arm into said second chuck means when said transfer arm is in said second position, said drive means being further operative to move said transfer frame to said dwell position after said second pusher has placed the article in said second chuck means, cutting means positioned adjacent each said chuck means to engage the article contained therein when said frame is in the dwell position, work loading means positioned adjacent said guide rails and said first chuck means, said work loading means having an arm and a pair of fingers at one end thereof for engaging the article carried by said gate, said arm and fingers being rotatable to position the article held therein to a position of alignment with said first chuck means when said transfer arm is in said second position, a pusher aligned with said first chuck means and operative to move the article from said feed finger into said first chuck means while said transfer arm is in said second position.

3. Apparatus for trimming sequentially the opposite ends of an elongated article comprising: first and second chuck means for successively holding the article, guide means for feeding the article in a substantially upright position to a location spaced from said first chuck means, a gate movable relative to the lower end of the guide means to position a single article from said guide means in a position adjacent thereto and to close the lower end of said guide means, feed fingers engageable with the article in said gate, said feed fingers being movable to position the article therein in registry with said first chuck means, a first pusher in registry with said first chuck means and movable to inject the article carried by said fingers into said first chuck, a transfer frame, a transfer member pivotally mounted on said transfer frame for carrying the article from said first chuck to a position of registry with said second chuck, means adjustably positioning said transfer frame relative to said first and second chuck means thereby to accommodate different article lengths, a second pusher in registry with said second chuck and movable to inject the article carried by said transfer member into said second chuck, cutting means associated with each said chuck means and engageable with the article held therein, said transfer frame being mounted for movement to a first position adjacent said chuck means and to a dwell position spaced from said chuck means, and cam means operative to move said transfer frame from said first position to said dwell position, to cause said finger to move as aforesaid when said transfer frame is in said first position and to cause movement of said transfer member as aforesaid when said transfer frame is in said dwell position.

4. Apparatus for trimming sequentially the opposite ends of an elongated article comprising: first and second chuck means for successively holding the article, guide means for feeding the article in an upright position to a location spaced from said first chuck means, a gate movable relative to the lower end of the guide means to position one article from said guide means in a position adjacent thereto and to close the lower end of said guide means, feed fingers engageable with the article in said gate, said feed fingers being movable to position the article therein in registry with said first chuck means, a first pusher in registry with said first chuck movable to inject the article into said first chuck, a transfer frame, means mounting said transfer frame for movement relative to said first and second chucks in direction generally parallel thereto, said means for mounting said transfer frame including an adjustably positioned stop to determine the maximum amount of travel toward said chucks, a transfer arm pivotally mounted on said transfer frame for movement from a position of registry with said first chuck to a position of registry with said second chuck, drive means operative to advance said transfer frame away from said chuck means to a dwell position after completion of the article transfer, cutting means associated with each chuck and engageable with the article held therein when said transfer frame is in the dwell position, a cam means operative to cause movement of said feed fingers in synchronized relation with said transfer frame and said transfer arm so that said feed fingers are moved as aforesaid when said transfer frame is adjacent said chucks and to move said transfer arm as aforesaid when said transfer frame is in the dwell position.

5. Apparatus for trimming sequentially the opposite ends of an elongated article comprising: first and second chuck means for successively holding the article, a feed trough inclined downwardly toward said first chuck means for feeding a plurality of articles in a substantially upright position to a location spaced from said first chuck means, a gate block closing the lower end of said guide means and movable to position one article from said guide means in exposed position adjacent thereto, said block having a slot therein in alignment with the end of said feed trough and dimensioned to receive one article from said feed trough, feed fingers longitudinally movable into engagement with the article in said gate and rotatable to position the article held therein in registry with said first chuck means, a first pusher in registry with said first chuck and movable to inject the article from said feed fingers into said first chuck, a transfer frame, means mounting said transfer frame for movement toward and away from said chuck means along a line generally parallel thereto to a first position adjacent said chuck means and a dwell position spaced from the chuck means, an adjustably positioned stop engageable with said transfer frame for determining the maximum travel of said transfer frame toward said first and second chuck, a transfer member pivotally mounted on said transfer frame movable to carry the article from said first chuck to a position of registry with said second chuck and to reverse the article end for end, said movable transfer frame and said stop permitting transfer and reversal of articles of widely varying lengths a second pusher in registry with said second chuck and movable to inject the article from said transfer member into said second chuck, cutting means associated with each said chuck and engageable with the article held therein, and means operative to cause movement of said feed fingers as aforesaid when said transfer frame is in said first position and to move said transfer arm as aforesaid when said transfer frame is in the dwell position.

6. A work-holding and transferring device for transferring an elongated article from one chucking device to a second chucking device and for reversing the article end for end comprising: a transfer frame, means mounting said transfer frame for movement toward and away from the chucking devices along a line generally parallel thereto to a first position adjacent said chucking devices and a dwell position spaced from said chucking devices, feeding means for transferring an elongated article to a pick-up station adjacent the first chucking means, means for transferring an elongated article from the pick-up station to a position of alignment with said first chucking means when the transfer frame is in said first position, a transfer arm, means rotatably mounting said transfer arm on said transfer frame at a position intermediate said chucking devices for movement between a position of alignment with the first chucking device to a position of alignment with the second chucking device, drive means for moving said transfer frame from said first position to said dwell position and for rotating the transfer arm to the position of alignment with said second chucking means while the transfer frame is in the dwell position.

7. The invention of claim 6 wherein the transfer member is adjustable relative to the chucking devices to accommodate different article lengths.

8. The invention of claim 6 wherein said feeding means includes a pair of parallel inclined feed rails and an oscillating gate at the pick up end of the feed rails and wherein the feed fingers pick up one article at a time aligned with a slot in the gate and including means for rotating the feed finger from the pick up station to a position of alignment with the first work-holding means.

9. Apparatus for transferring an elongated article from one chucking device to a second chucking device and for reversing the article end for end comprising: a transfer frame, means for mounting said transfer frame for movement toward and away from the chucking devices along a line generally parallel thereto, a transfer arm having gripping fingers extending at substantially right angles to said transfer arm, said transfer arm being movably mounted on said transfer frame for moving said gripping fingers for movement between a position of alignment with the first chucking device to a position of alignment with the second chucking device and drive means for moving said transfer frame to a dwell position spaced from the chucking devices and for moving the transfer arm to the position where the gripping fingers are in alignment with the second chucking means while the transfer frame is in the dwell position.

10. Apparatus for transferring an elongated article from one chuckin device to a second chucking device, for reversing the article end for end and for removing the article from the second chucking device comprising: a transfer frame, means mounting said transfer frame for movement toward and away from said chucking devices, a pair of transfer arms, means for rotatably mounting one of said transfer arms on said transfer frame for movement between a position of alignment with the first chucking device to a position of alignment with the second chucking device, means for rotatably mounting the other transfer arm on said transfer frame for movement between a position of alignment with said second chucking device and to a discharge position, drive means for moving said transfer frame to a dwell position, for rotating said first transfer arm to the position of alignment with said second chucking means, for rotating said transfer arm to a discharge position while the transfer frame is in the dwell position.

11. Apparatus for transferring an elongated article from one chucking device to a second chucking device and for reversing the article end for end comprising, a transfer frame mounted for movement toward and away from the chucking devices along a line generally parallel thereto, a transfer arm rotatably mounted on said transfer frame for movement between a position of alignment with the first chucking device to a position of alignment with the second chucking device, and drive means for moving said transfer frame to a dwell position spaced from the chucking devices and for moving the transfer arm to the position of alignment with the second chucking means while the transfer frame is in the dwell position.

12. Apparatus for transferring an elongated article from one chucking device to a second chucking device and for reversing the article end for end comprising, a transfer frame, means mounting said transfer frame for movement toward and away from the chucking devices along a line generally parallel thereto, a transfer arm, means rotatably mounting said transfer arm on said transfer frame at a position lying on a line midway between said chucking devices for movement between a position of alignment with the first chucking device to a position of alignment with the second chucking device, drive means for moving said transfer frame to a dwell position spaced from the chucking devices and for rotating the transfer arm to the position of alignment with second chucking means while the transfer frame is in the dwell position, and a stop carried by the mounting means for said transfer frame for limiting movement of said frame towards the chucking means.

References Cited in the file of this patent

UNITED STATES PATENTS

| | | |
|---|---|---|
| 230,638 | King | Aug. 3, 1880 |
| 2,009,751 | Stenman | July 30, 1935 |
| 2,544,218 | Burdsall | Mar. 6, 1951 |
| 2,547,551 | Yost | Apr. 3, 1951 |
| 2,689,361 | Schaeffer | Sept. 21, 1954 |
| 2,779,956 | Butler | Feb. 5, 1957 |
| 2,811,267 | Bock | Oct. 29, 1957 |
| 2,881,452 | Klooz | Apr. 14, 1959 |